March 5, 1935.  R. J. PARSONS  1,993,521
ELECTRIC CAR HEATER
Filed Nov. 24, 1931
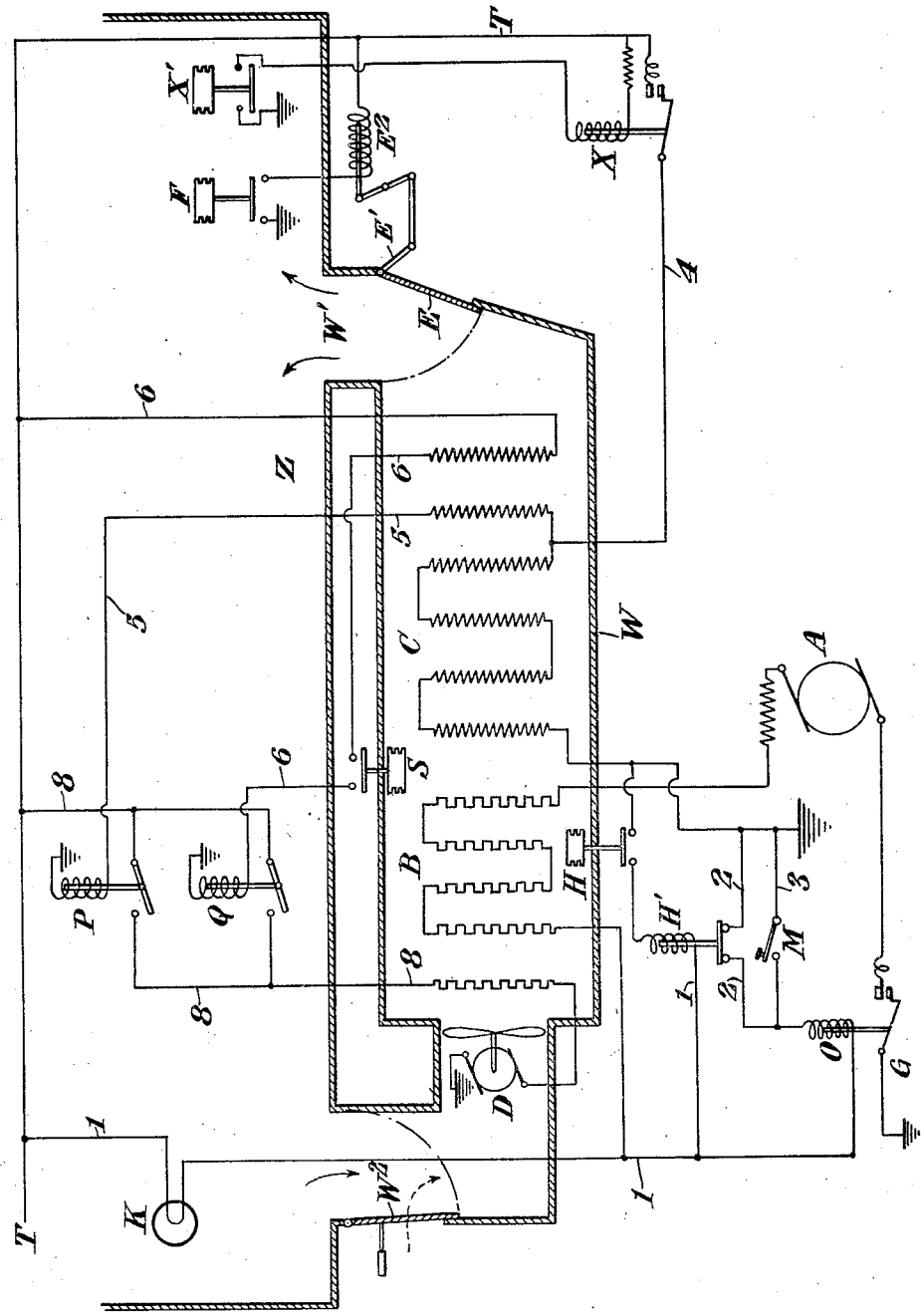
INVENTOR
Robert J. Parsons
BY
E. M. Bentley
ATTORNEY Patented Mar. 5, 1935

1,993,521

UNITED STATES PATENT OFFICE 1,993,521

ELECTRIC CAR HEATER

Robert J. Parsons, Schenectady, N. Y., assignor to Consolidated Car-Heating Company, Inc., Albany, N. Y., a corporation of New York Application November 24, 1931, Serial No. 577,083

10 Claims. (Cl. 219—20)

For a detailed description of the present form of my invention, reference may be had to the following specification and to the accompanying drawing forming a part thereof.

My invention relates to electric car heating. In the patent of Joseph M. Bosenbury, granted March 12, 1929, No. 1,705,393, there is shown and claimed a car heater in which certain of the individual heater casings in the body of a car contain heater coils which are partly of the usual type, being connected in shunt to the propelling motor of the car, (which may be called the traction motor) and also in part of other heaters which are in series with the traction motor and serve, besides their heating function, as regulating rheostats for the traction motor. My car heater is fundamentally of the Bosenbury type but contains certain important improvements thereon. For example, the nature of the heating effects obtainable with coils which are also being manipulated by the car propeller, are uncertain; their manipulation has nothing to do with car heating; they are dependent on acceleration, grades and braking of the traction motors, and on other considerations not incident to car heating, including the individual idiosyncrasies of the various motormen. For that reason I have grouped these two sorts of heating coils in a separate enclosure, communicating with the interior of the car body, and provide in connection therewith a draft-creating means, preferably an electrically operated blower, which directs an air current over the combined heaters in the said enclosure, which current passes thence into the car body. By this means I am able to deal with the aggregate heat of the two inconsistent kinds of heaters and can secure a definite heat in the car, regardless of the difference in the treatment required by the two kinds of heaters. I also provide for cutting off the series coils in an emergency, which involves the disabling of the traction motors, although such is not the case with the shunt heater coils. While the shunt coils, which are of a definite and calculable kind, and may be more or less cut out of circuit at will for regulative purposes, the series coils must be cut in or out with reference to the needs of the traction motors, regardless of their heating duty. I therefore provide a regulative system which begins with the shunt coils which may be controlled by themselves, and, if necessary, may be all cut out of the circuit. Then I proceed by regulation of the series heater coils, not by cutting them in or out of circuit, but by leaving them in circuit, as the controller may require, and diverting more or less of their heat into the outer air instead of into the car body. By this means I secure a consistent and practical regulation of the car heat in spite of the unequal yoking together of the different kinds of heater coils. My device is of importance practically, for, while the series coils provide a considerable amount of heating capacity, it has heretofore been thrown away because of the impossibility of subjecting these coils to regulation for heating without interfering with the regulation for car-propelling purposes.

The single figure in the drawing shows my improved heating system as applied to a car.

Referring to the drawing A represents the traction motor which propels the car. B represents the resistances in series with traction motor A and are to be adjusted in the ordinary way to control said motor, and are also to be utilized for heating the car. C represents ordinary heating coils in shunt with the traction motor. Coils B and C are both shown as enclosed in a chamber or compartment W which is separate from the car body Z but communicating therewith by a duct $W^1$. The compartment W is here shown as located beneath the car but it may be located at any other suitable position about the car as long as it communicates therewith.

At the left end of compartment W is an electrically propelled blower fan D, which serves to convey the heated air from compartment W out through the duct $W^1$ into the car body Z. There may be a damper $W^2$ back of fan D, adjustable, manually or otherwise, for admitting outside fresh air into compartment W to mingle with the air in the compartment, which air would otherwise be merely circulated and recirculated between the compartment and the car body by the fan D. The shunt heating coils C, being independent of the traction motor A, and having a calculable resistance and heating effect, may be automatically cut in or out of the circuit to adjust said heating effect. Thus X, at the right, represents a relay magnet that will open or close the circuit 4 leading to the said shunt coils C under the control of a thermostat $X^1$. But, on the contrary, the heater coils B can not be so controlled, but must be under the control of the usual car-controller that determines the power and speed, and often the braking function of the traction motor A. Therefore the coils B, while giving a large amount of heat, can not be cut into and out of circuit, like the shunt coils C, to adjust their heating effect for it would interfere with their relation to the traction motor A. I therefore adjust their heating effect differently. I leave them permanently in circuit in compartment W but any excess of heat which they may give is directed from the car body Z into the atmosphere by an air-damper E. This damper E may be adjusted either by a handle $E^1$ or by a relay magnet $E^2$ under control of a thermostat F. But heater coils B and C are in the same separate compartment W, and I therefore am able to adjust their aggregated heating effect in the compartment W before that heat is introduced into the car body Z. I prefer to so set the thermostat X¹ that it will act first, as heat accumulates, to cut out the shunt resistances C. Then the thermostat F will take up the regulation and adjust the heat developed by the series heater coils B by means of the damper E. This regulation by damper E does not involve the cutting out of the series coils. However, it becomes necessary, in certain cases, to cut coil B out of circuit and this I accomplish by means of the line-braker G of the traction motor A. Thus in a circuit 1 is a circuit-breaking relay H¹, this relay H¹ being controlled by a thermostat H, which closes a break in said circuit 1. The said relay magnet H¹ opens the circuit 2, leading to the trip-magnet O of the line-breaker G. For instance, if the blower fan should become stalled for any reason—which is a possible emergency—the heat would rise in compartment W to such a degree that thermostat H would act and cause the closure of circuit 1 and the consequent action of relay magnet H¹ to break circuit 2 which contains the trip-magnet O of the line-breaker G. If this should occur at an inopportune time—for example—when the car was one of a line of cars waiting at a railway-crossing for the passage of a train—it would cause an inconvenient stoppage of all the traffic behind the disabled car. I therefore provide a hand switch M by which the motorman can close a by-pass 3 around the break in circuit 2. I also provide a warning signal K in the aforesaid circuit 1 which will act, and give notice to the motorman whenever the relay H closes circuit 1. That closure of the by-pass circuit by switch M would enable the motorman to keep his car in action till he should reach a place where he could repair the blower circuit.

The circuit to the blower motor D is controlled by two relay magnets P and Q. Magnet P is in circuit 5 leading from the shunt coil circuit 4. Magnet Q is in a circuit 6, controlled by a thermostat S in the compartment W and started from the trolley wire T. Either one of these magnets P and Q will, when energized, close the blower motor circuit 8 from the trolley wire. Magnet P will act whenever the circuit 4 is closed but magnet Q will only close the blower when the temperature in the car body, as determined by thermostat S, has reached a condition where the starting of the blower is advisable. Either mode of starting the blower, by relay P when the shunt heating coils are connected in, or, by relay Q when the thermostat S determines, may be employed. In operation, the circuit from the trunk line T (connected with the trolley) to the motor A, and then to ground, is through the rheostat coils B in the usual manner, and also through the line breaker G, which is between the motor and the ground. The line breaker is normally held in circuit-closed position by a circuit leading from the trunk line T through coil O of the line breaker circuit 2—2 which also includes the contacts for the relay H'. The coil of relay H' is included in circuit 1—1 leading from trunk line T, and including the contacts of a thermostatic switch H, the thermal element of which is so arranged as to normally maintain the switch in open-circuit position. However, upon a rise of temperature in the vicinity of the coils B, to a dangerous degree, thermostat H operates to close the circuit 1—1, thereby energizing the coil of relay H', and breaking the circuit 2—2 through the coil O. Thereupon, the circuit to motor A is broken.

The circuit for the coils C is connected with the trunk line by a magnetic switch X, said coils being grounded in any desired manner, a part of this circuit dividing and passing through circuit 5—5 to ground, the last mentioned circuit including the coil of the magnetic switch P. Said switch P controls a circuit 8—8 from the trunk line T through the fan motor D. Thus, it will be observed that the fan is normally placed in operation while current is passing through the coils C. A supplemental fan control circuit 6—6 connects the trunk line T with the coil of a magnetic switch Q, in a portion of the circuit 8—8, which by-passes the switch P. The circuit 6—6 is in turn controlled by a thermostatic switch S, so that if the temperature in the compartment W becomes excessively high while the coils C are not energized, said thermostatic switch will close the circuit 6—6, thereby energizing the coil of magnetic switch Q, and causing the switch to close the circuit to the fan motor.

The circuit through the coils C is controlled by a magnetic switch X, the coil of which is in a branch circuit connected with the trunk line T and by-passing the contacts of the switch. This branch circuit is controlled by a thermostatic switch X', so arranged as to close the circuit when the temperature within the space Z reaches a predetermined degree.

What I claim as new and desire to secure by Letters Patent is:

1. In a heating system of the character described, the combination with a motor, of heating means consisting of the motor rheostat coils in series with said motor and other heating coils in shunt relation to said motor, said rheostat coils and said other heating coils being positioned adjacent to each other in such manner that the cumulative heating functions of both may be utilized, means for normally maintaining said rheostat coils in circuit during operation of the motor, means for causing a current of air to pass over the heating means, means for changing the direction of delivery of said air current, a motor control switch, a circuit including means for controlling the last mentioned switch, a switch controlling the last mentioned circuit, and a thermally responsive circuit controlling the last mentioned switch, said thermally responsive circuit being so constructed and arranged as to be influenced by the temperature of said rheostat coils for opening said switch.

2. In a car heating system, the combination with a motor, of heating means consisting of regulating rheostat coils for the motor in series therewith and other heater coils in shunt therewith, an enclosure having a discharge opening communicating with the interior of the car, said coils being positioned adjacent each other within said enclosure, means for cutting the shunt coils into and out of circuit so as to control the heating functions thereof, the rheostat coils being normally maintained in circuit during operation of the motor, an electrically operated blower for causing a current of air to travel through said enclosure and over said coils, means controlled by the circuit through said shunt coils for maintaining the blower circuit, and thermally responsive means for maintaining said blower circuit while the shunt coils are deenergized.

3. In a car heating system, the combination with a motor, of heating means consisting of regulating rheostat coils for the motor in series therewith and other heater coils in shunt with said motor, an enclosure having a discharge opening communicating with the space to be heated, said coils being positioned adjacent each other within said enclosure, means for cutting the shunt coils into and out of circuit so as to control the heating functions thereof, the rheostat coils being normally maintained in circuit during operation of the motor, a blower for conveying heat from said enclosure through said discharge opening, and two relays in separate circuits for selectively controlling the blower circuit, one of said relays being actuated while the shunt coils are in circuit and the other of said relays being thermally controlled by the heat within said enclosure.

4. In a car heating system, the combination with a motor, of heating means consisting of regulating rheostat coils for the motor in series therewith and other heater coils in shunt with said motor, an enclosure having a discharge opening communicating with the space to be heated, said coils being positioned adjacent each other within said enclosure, means for cutting the shunt coils into and out of circuit so as to control the heating functions thereof, the rheostat coils being normally maintained in circuit during operation of the motor, an electrically propelled blower for conveying the heat from said enclosure outwardly through said opening, a normally closed line breaker in the motor circuit, and means for automatically tripping the line breaker so as to open the motor circuit, said means being constructed and arranged to operate in the event of stoppage of the blower motor.

5. In a car heating system, the combination with a motor, of heating means consisting of regulating rheostat coils for the motor in series therewith and other heater coils in shunt therewith, said rheostat coils being normally maintained in circuit during operation of the motor, an enclosure in which said coils are located adjacent each other, said enclosure having a discharge opening at one end communicating with the interior of the car, an electrically operated blower for creating a current of air through said enclosure and in contact with said coils, means for cutting the shunt coils into and out of circuit so as to control the heating functions thereof, means controlled by the circuit through the shunt coils for maintaining the blower circuit, thermally responsive means responsive to heat generated by the several coils for maintaining the blower circuit, and thermally responsive means for opening the motor circuit, said last mentioned means being constructed and arranged to operate upon overheating of the rheostat coils.

6. In a car heating system, the combination with a car, of a compartment separated from the car body but communicating with the interior of the car at one end, said compartment having two outlets at the other end, one of which communicates with the interior of the car and the other communicates with the outside atmosphere, a damper so mounted that it will close either of said outlets, heating coils within the compartment, means for creating a current of air through said compartment over said coils, and means for operating said damper, and means controlling the circuit through said coils, said damper operating means and said last mentioned circuit control means being so constructed and arranged as to be operated in a predetermined sequence.

7. In a car heating system, the combination with a car, of compartment separated from the car body but having one end in communication with the interior of said car body, means for selectively connecting the other end of said compartment either with the interior of said car or with the outside atmosphere, heating coils within said compartment, means for creating a current of air through said compartment and over said coils, operating means for the selective connection between said compartment and the car body or the atmosphere, and means controlling the circuit through said heating coils, said selective operating means and said coil circuit controlling means being so constructed and arranged as to be operated in a predetermined sequence.

8. In a car heating system of the character described, the combination with a motor, of heating means consisting of the motor rheostat coils in series with the motor and other heating coils in shunt relation to said motor, said rheostat coils and said other heating coils being so relatively constructed and arranged that the cumulative heating functions of both may be utilized, means for normally maintaining said rheostat coils in circuit during operation of the motor, means for causing a current of air to pass over said heating means, means for diverting the direction of flow of said air current, a circuit controlling said air diverting means, said circuit including a thermostat, and a circuit so constructed and arranged as to control the circuit to the shunted coils and also including a thermostat, said thermostats being set to operate in a predetermined sequence.

9. In a car heating system, the combination with a motor, of heating means consisting of the motor rheostat coils in series with said motor and other heating coils in shunt relation to said motor, said rheostat coils and said other heating coils being so constructed and arranged that the cumulative heating functions thereof may be utilized for heating purposes, a container separated from the car body but communicating therewith, said coils being located within said container, means for causing a current of air to pass through said container and over the heating means, means for placing the shunt coils into and out of circuit so as to control the heating functions thereof, the rheostat coils being normally maintained in circuit during operation of the motor, means for changing the delivery of the air current passing through the container, a circuit controlling said direction changing means, said circuit including a thermostatic switch, and a circuit controlling the circuit to the shunted coils and also including a thermostatic switch, said thermostatic switches being set to operate in a predetermined sequence.

10. In a car heating system, the combination with a motor, of heating means consisting of regulating rheostat coils for the motor in series therewith and other heater coils in shunt with the motor, said rheostat coils and said heater coils being so relatively positioned that the cumulative heat of both may be used for heating purposes, a line breaker in the motor circuit, a controlling circuit for the line breaker, and controlling means for said controlling circuit including a thermostat so positioned adjacent to the rheostat coils as to be influenced by the temperature created by said coils, said line breaker, its controlling circuit and said controlling means being so constructed and relatively arranged as to break the motor circuit when the temperature generated reaches a predetermined degree.

ROBERT J. PARSONS.